RETRACTABLE TONE ARM SUPPORT POST FOR COMPACT RECORD CHANGER

Filed Oct. 30, 1963 2 Sheets-Sheet 1

INVENTORS
Ralph E. Freathy and
Robert J. Hammond
By Brown, Jackson, Boettcher & Dienner
Att'ys.

RETRACTABLE TONE ARM SUPPORT POST FOR COMPACT RECORD CHANGER

Filed Oct. 30, 1963 2 Sheets-Sheet 2

INVENTORS
Ralph E. Freathy and
Robert J. Hammond
By Brown, Jackson, Boettcher & Dienner
Att'ys.

United States Patent Office 3,244,423
Patented Apr. 5, 1966

3,244,423
RETRACTABLE TONE ARM SUPPORT POST FOR COMPACT RECORD CHANGER

Ralph E. Freathy and Robert J. Hammond, Stevensville, Mich., assignors to V-M Corporation, Benton Harbor, Mich., a corporation of Michigan Filed Oct. 30, 1963, Ser. No. 320,096
12 Claims. (Cl. 274—23)

The present invention relates to a compact record changer of a type having a turntable of reduced size. More specifically, the invention relates to a retractable tone arm support post for such a record changer wherein the support post is movable to a retracted position during the playing of a record so as to be disposed in a recess in the baseplate and under any records on the turntable, and wherein the support post can be manually moved to an upright operative position for supporting a tone arm in a storage position when the record changer is not in use. The retractable support post of the present invention may be used in combination with a standard stationary rest post whereby the tone arm will be automatically positioned on the stationary rest post after the playing of a record as is conventional in the art.

In the design of portable record changers it is of course desirable to reduce the overall size and weight of the changer as much as possible, at least to the extent that this can be accomplished without significantly impairing the operating characteristics of the apparatus. One component which can be reduced in size is the turntable, and while a 9 inch turntable has become somewhat of a standard with ordinary record changers, it is feasible to provide a turntable of lesser dimensions for use with small portable units. For example, a turntable having a diameter of approximately 6 inches may be used with certain types of portable record changers, and in order to obtain the fullest advantage from use of such a turntable it is desirable to reduce the size of the overall cabinet or case a corresponding amount at least to the extent that this is possible.

One of the limiting factors relative to the overall size of the record changer cabinet or case is the tone arm, since the tone arm is a relatively lengthy member and it must be able to pivot about a vertical axis from an at rest position wherein it is positioned on a stationary rest post and disposed radially outwardly of the periphery of a record on the turntable, to a radially inner position wherein it can move inwardly to a location proximate the center of a record on the turntable to effect the playing of the entire record. Consequently, the length of the tone arm and the space required to permit the usual sequence of movements thereof will normally impose severe restrictions on any attempt to reduce the overall cabinet size for a portable or other compact record changer.

One object of the present invention is to provide a retractable tone arm support post for holding the tone arm in a predetermined inoperative storage position when the record changer is not in use, the storage position being so located as to permit the use of a cabinet or case of substantially reduced overall dimensions.

In furtherance of the foregoing object, we provide a record changer having a conventional stationary rest post for supporting a tone arm in a position radially outwardly of the periphery of a record on the turntable, and in combination therewith we provide a retractable tone arm support post disposed radially inwardly of the stationary rest post. The tone arm support post can be retracted to an inoperative position during a playing cycle so as not to interfere with the normal operation of the record changer, and when the record changer is not in use the support post can be moved to an upright operative position for holding the tone arm in a storage position wherein the tone arm is disposed radially inwardly of its normal at rest position so as to extend substantially entirely over the baseplate and in some instances over the turntable. It will be understood that in a conventional record changer the storage position of the tone arm is the same as its normal at rest position, and in accordance with the present invention the storage position is disposed radially inwardly of the conventional at rest position so as to permit the use of a substantially smaller cabinet or case for the record changer mechanism.

Another object of the invention is to provide a retractable tone arm support post for holding a tone arm in a storage position which support post is automatically moved to its retracted inoperative position when the tone arm is raised to release it from the support post.

A further object is to provide a tone arm support post as last above-mentioned which when retracted lies approximately parallel to the baseplate and below the level of a record on the turntable, and which is provided with means to permit the support post to be manually raised to an upright position and locked therein when it is desired to support the tone arm in a storage position.

Still another object of the invention is to provide a compact record changer having in combination, a turntable of reduced diameter, a stationary tone arm rest post disposed outwardly of the periphery of a record on the turntable, and a retractable tone arm support post disposed radially inwardly of the stationary rest post so as to be usable for supporting the tone arm in a storage position.

Other advantages and uses of our invention will be apparent, or become so, as we describe our invention in greater detail in conjunction with the accompanying drawings in which.

Figure 3:
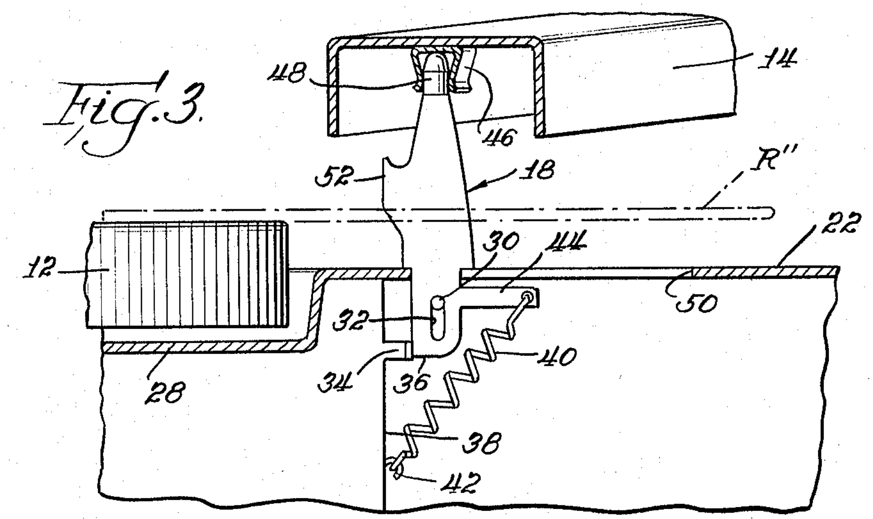
FIGURE 3 is an enlarged fragmentary vertical section showing the manner in which the retractable support post is pivotally mounted on the record changer baseplate structure, the support post being shown locked in its upright operative position with the upper end thereof engaged by a clip member carried on the tone arm for holding the latter in a storage position.
Figure 4:
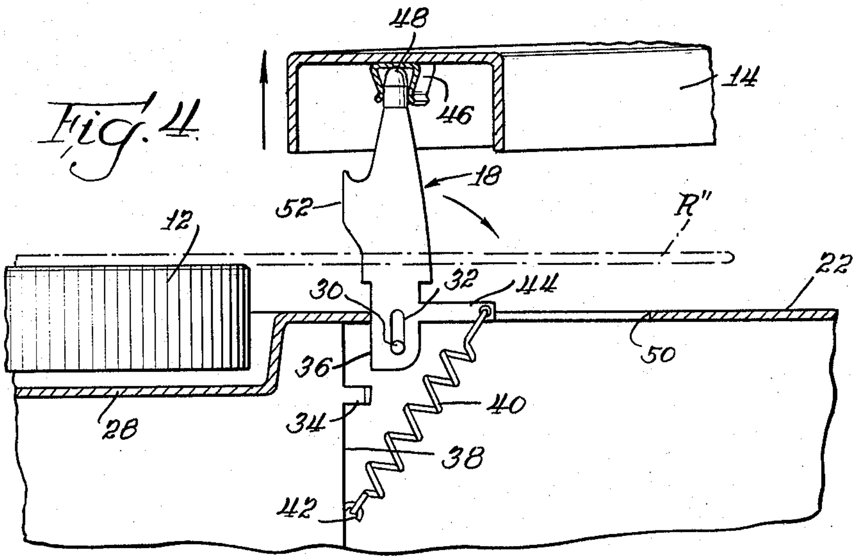
Figure 5:
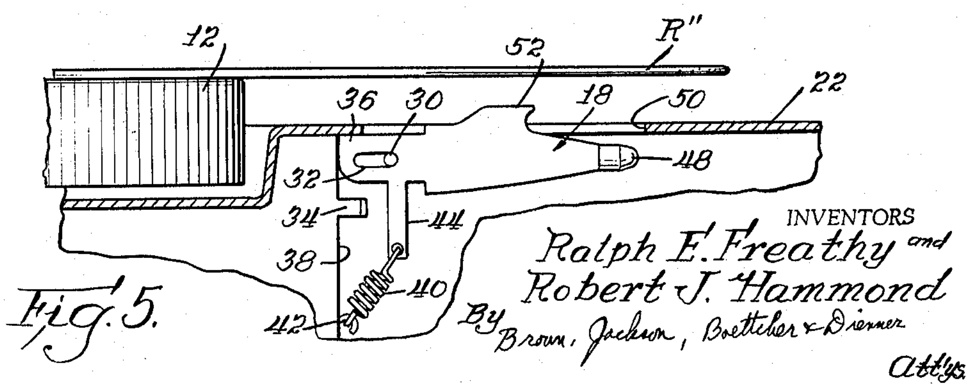

FIGURE 4 is a view similar to FIGURE 3 showing the tone arm partially raised as when the latter is being manually pulled away from the support post, the support post also being shown in a raised position to which it is moved by the tone arm thereby releasing the support post from its locking means; and FIGURE 5 is a view similar to FIGURE 3 showing the tone arm support post in its retracted inoperative position.

Figures 1, 2:
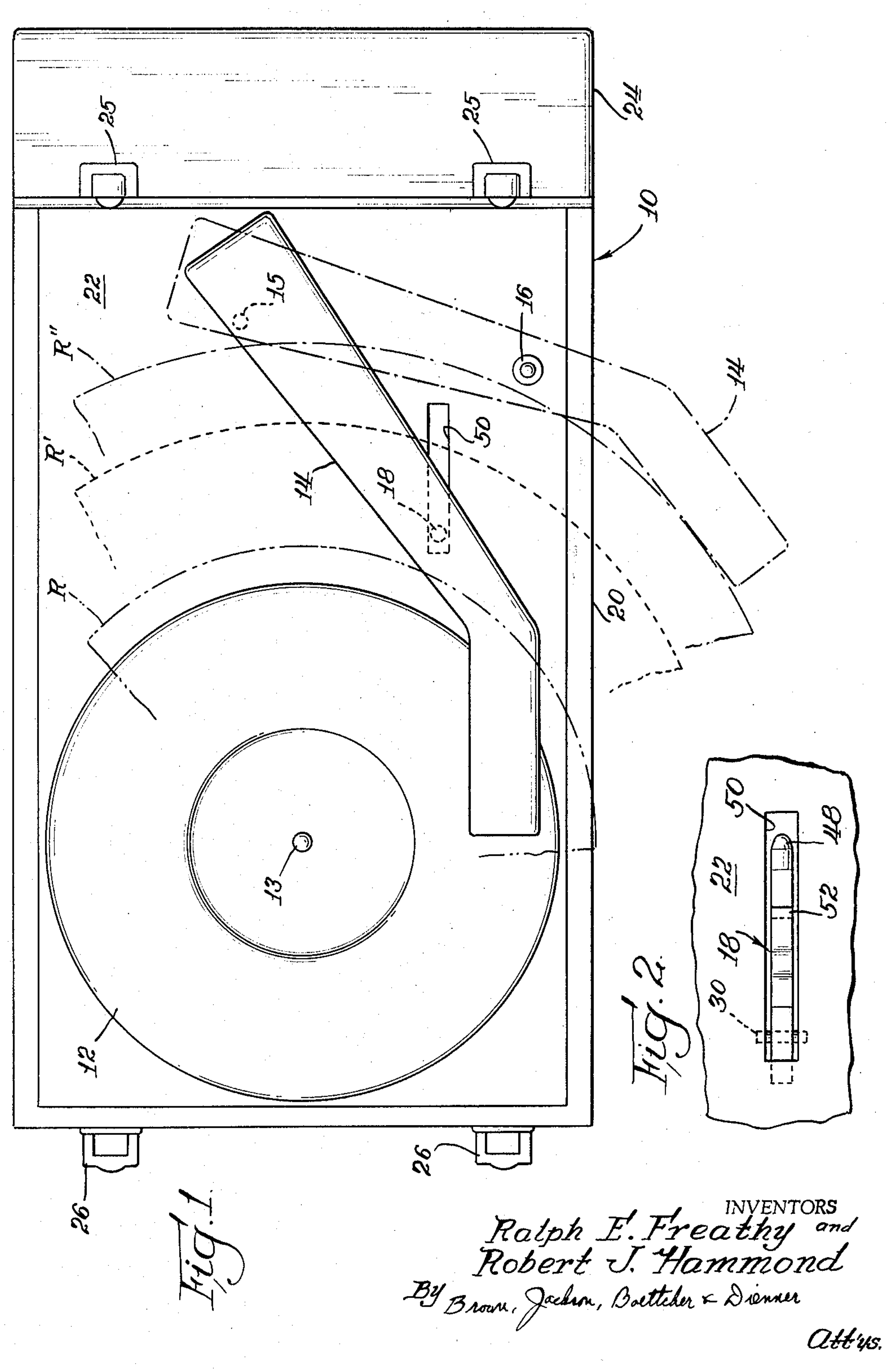
FIGURE 1 is a top plan view of a compact record changer equipped with a retractable tone arm support post in accordance with the principles of the present invention, the tone arm being shown in solid lines in a storage position as when supported on the retractable rest post and being shown in dash lines in its normal at rest position as when supported on a conventional stationary rest post.
FIGURE 2 is an enlarged fragmentary top plan view showing the retractable tone arm support post disposed in its retracted position in an opening formed in the record changer baseplate.

Referring now to the drawings, FIGURE 1 shows a compact portable record changer comprising a carrying case or cabinet 10, a turntable 12, a record supporting spindle 13, a tone arm 14, a tone arm pivot 15, a stationary tone arm rest post 16, and a retractable tone arm support post 18. The case 10 includes a lower portion 20 within which a baseplate 22 and other record changer components are mounted, and a pivotal upper case portion 24 which is shown in its upright open position. It will be understood that when the tone arm 14 is in its storage position as shown in solid lines, the upper case portion 24 can be pivoted to a closed position and latched therein by the latching means 25 and 26.

In the preferred embodiment being described herein, the turntable 12 is of a reduced size so as to permit reduction of the overall dimensions of the record changer and of the case 10. Thus, the turntable 12 is approximately 6 inches in diameter as compared with a conventional 9 inch turntable, and it is adapted for playing the usual 7 inch, 10 inch and 12 inch records which are indicated respectively at R, R′ and R″ in FIGURE 1.

The stationary rest post 16 is fixedly mounted to the baseplate 22 so as to project upwardly therefrom, and it is positioned in the conventional manner radially outwardly of the periphery of a 12 inch record. It will be understood that the record changer shown in FIGURE 1 may embody mechanism responsive to the completion of the playing of a record for automatically lifting the tone arm 14 from the record and placing it in playing position on the next record which is dropped to the turntable, and for automatically positioning the tone arm on the rest post 16 after the playing of the last record on the spindle 13. However, such automatic record changer mechanism is conventional in the art and will not be described herein.

It will be noted that due to the reduced size of the turntable 12, baseplate 22 and case 10, the larger 10 inch and 12 inch records R′ and R″ will extend well beyond the boundaries of the baseplate and case, and the tone arm 14 when disposed on the stationary rest post 16 will also project forwardly well beyond the front side of the case. Consequently, when the record changer is not in operation the records can be removed from the turntable, the retractable support post 18 moved to its upright operative position, and the tone arm 14 then removed from the rest post 16 and secured in a storage position on the support post 18.

In the storage position, as shown in solid lines in FIGURE 1, the tone arm 14 is disposed within the confines of the case 10 so that if desired the upper case portion 24 can be closed and locked by the latching means 25 and 26. Similarly, if the record changer of FIGURE 1 is used other than as a portable record changer, as in a compact console or as a table model, the use of the retractable support post 18 provides substantially the same advantages in that it permits the tone arm 14 to be stored in a position wherein it does not project outwardly beyond the confines of the baseplate 22. This is true even though it is necessary that the tone arm project outwardly beyond the baseplate during normal operation due to the fact the turntable and baseplate are of reduced size and yet are adapted to handle the standard 7 inch, 10 inch and 12 inch records.

Referring now to FIGURES 3–5, there is shown the baseplate 22 which is provided with a depressed portion 28 to accommodate the turntable 12. The support post 18 is pivotally mounted on a pin 30 which is fixedly supported relative to the baseplate 22 in any suitable manner, a longitudinal slot 32 being provided in the support post to accommodate the pin. When the support post 18 is in its upright operative position as shown in FIGURE 3, it is held in such position by means of a stop 34 which bears against the lower end 36 of the support post. The baseplate 22 is formed with a depending wall portion 38 from which the stop 34 projects, and a tension spring 40 has one end connected to the depending wall 38 at 42 and its other end connected to a tab 44 which projects outwardly from the support post 18. As viewed in FIGURE 3, the spring 40 tends to bias the post 18 downwardly and also tends to rotate it in a clockwise direction about the pin 30, and in this manner the post is maintained in its upright position by being urged against the stop 34.

The tone arm 14 has mounted at its underside a conventional spring clip member 46 which is adapted to snap over an upper end portion 48 on the support post 18 whereby when the post is maintained in its upright operative position of FIGURE 3 the tone arm can be urged downwardly to force the clip over the portion 48 thereby retaining the tone arm in its storage position as shown in solid lines in FIGURE 1.

The baseplate 22 is formed with an aperture 50 for receiving the support post 18 when the latter is not in use. That is, the support post can be pivoted about the pin 30 so as to retract the post into the opening 50 whereby it will lie substantially beneath the surface of the baseplate 22 as shown in FIGURE 5. It will be understood that the tone arm 14 is removed from the retractable support post 18 by being manually lifted to release the spring clip 46 from the upper end 48 of the post. When the tone arm is thus lifted to release it from the support post 18, the post is raised along with the tone arm until the pin 30 reaches the lower end of the slot 32. When the post 18 is thus lifted to the position of FIGURE 4, the post will not be able to move any higher, and thus further lifting of the tone arm 14 will cause the latter to be released from the support post, after which the tone arm can be placed on the stationary rest post 16 for normal operation.

It will be understood from the foregoing that when the tone arm 14 is removed from the support post 18 the latter is raised to the position of FIGURE 4, and it will be seen that in such position the lower end 36 of the post is clear of the stop 34 so as to be free to pivot clockwise about the pin 30 to its retracted position. Consequently, due to the force of the tension spring 40, the post 18 will be pivoted about the pin 30 until the lower end 36 of the post engages the underside of the baseplate 22, at which time the post will be disposed in its retracted horizontal position as shown in FIGURE 5 so as to lie substantially recessed beneath the upper surface of the baseplate 22.

When the support post 18 is retracted within the opening 50 in the baseplate 22 as shown in FIGURE 5, a finger lift 52 which is formed integral with the post will project somewhat above the level of the baseplate so as to permit the post to be raised by manually lifting the member 52. Thus, it is only necessary to manually engage the lift 52 so as to first pivot the support post 18 counterclockwise to the position of FIGURE 4, and then by moving the post downwardly into the position of FIGURE 3 the post will be locked in its upright operative position. It can be seen from FIGURE 5 that when the support post 18 is in its retracted position it is disposed substantially beneath the level of a record R″ on the turntable 12 so that it will not interfere with the normal operation of the record changer. FIGURE 2 is a fragmentary top plan view showing the post 18 retracted within the opening 50 in the baseplate 22.

While the compact record changer described herein is particularly well suited for use as a portable record changer, it will be understood that it can also be advantageously used in a console or table model or in any other application where it is desired to reduce the dimensions of the cabinet or case within which the changer is housed, and it will be further understood that the retractable rest post of the present invention is particularly advantageous when used in combination with a turntable of reduced size and a narrow baseplate.

While we have illustrated our invention in a preferred form, we do not intend to be limited to that form, except insofar as the appended claims are so limited, since modifications coming within the scope of our invention will be readily suggested to others with our disclosure before them.

We claim:

1. In a record changer of the type having a baseplate, a turntable, and a tone arm pivotable about a vertical axis for reproducing records on the turntable, the improvement comprising, in combination, a stationary rest post extending upwardly from the baseplate at a location radially outwardly of the periphery of a record on the turntable for supporting the tone arm in a normal at rest position, and a retractable support post disposed radially inwardly of said rest post for supporting the tone arm in a storage position, said support post being movable between an upright operative position wherein it is adapted to support said tone arm and a retracted inoperative position wherein it is disposed beneath the level of a record on the turntable.

2. In a record changer of the type having a baseplate, a turntable, and a tone arm pivotable about a vertical axis for reproducing records on the turntable, the improvement comprising, in combination, a stationary rest post extending upwardly from the baseplate at a location radially outwardly of the periphery of a record on the turntable for supporting the tone arm in a normal at rest position, an opening formed in said baseplate at a location radially inwardly of said rest post, and a retractable support post disposed in said opening for supporting the tone arm in a storage position, said support post being movable between an upright operative position wherein it is adapted to support said tone arm and a retracted inoperative position wherein it is retracted within said opening so as to lie substantially beneath the upper surface of said baseplate.

3. In a record changer of the type having a baseplate, a turntable, and a tone arm pivotable about a vertical axis for reproducing records on the turntable, the improvement comprising, in combination, a stationary rest post extending upwardly from the baseplate at a location radially outwardly of the periphery of a record on the turntable for supporting the tone arm in a normal at rest position, and a retractable pivotally mounted support post disposed radially inwardly of said rest post for supporting the tone arm in a storage position, said support post being pivotable between an upright operative position wherein it is adapted to support said tone arm and a retracted inoperative position wherein it is disposed beneath the level of a record on the turntable.

4. In a record changer of the type having a baseplate, a turntable, and a tone arm pivotable about a vertical axis for reproducing records on the turntable, the improvement comprising, in combination, a stationary rest post extending upwardly from the baseplate at a location radially outwardly of the periphery of a record on the turntable for supporting the tone arm in a normal at rest position, a retractable pivotally mounted support post disposed radially inwardly of said rest post for supporting the tone arm in a storage position, said support post being pivotable between an upright operative position wherein it is adapted to support said tone arm and a retracted inoperative position wherein it is disposed beneath the level of a record on the turntable, and means for releasably locking said support post in said upright operative position.

5. In a record changer, in combination, a baseplate, a turntable, a tone arm pivotable about a vertical axis for reproducing records on the turntable, a stationary rest post extending upwardly from said baseplate at a location radially outwardly of the periphery of a record on the turntable for supporting the tone arm in a normal at rest position, a retractable pivotally mounted support post disposed radially inwardly of said rest post for supporting the tone arm in a storage position, said support post being pivotable between an upright operative position wherein it is adapted to support said tone arm and a retracted inoperative position wherein it is disposed beneath the level of a record on the turntable, releasable gripping means on said tone arm for gripping the upper end of said support post when said tone arm is urged downwardly thereagainst so as to fixedly associate said tone arm with said support post, said tone arm being releasable from said support post upon manual lifting of said tone arm, and locking means for releasably locking said support post in said upright operative position.

6. The invention of claim 5 wherein said support post is movable vertically a limited amount when in its upright position between a lower vertical position wherein said locking means is operative and an upper vertical position wherein said locking means is inoperative, said support post normally being in said lower vertical position when supporting said tone arm in said storage position and being movable by said tone arm to its upper vertical position when said tone arm is raised whereby when said tone arm is manually lifted to release the same from said support post the latter will automatically be moved to said upper vertical position wherein said locking means will be inoperative.

7. In a record changer, in combination, a baseplate, a turntable, a tone arm pivotable about a vertical axis for reproducing records on the turntable, a stationary rest post extending upwardly from said baseplate at a location radially outwardly of the periphery of a record on the turntable for supporting the tone arm in a normal at rest position, a retractable pivotally mounted support post disposed radially inwardly of said rest post for supporting the tone arm in a storage position, said support post being pivotable between an upright operative position wherein it is adapted to support said tone arm and a retracted inoperative position wherein it is disposed beneath the level of a record on the turntable, releasable gripping means on said tone arm for gripping the upper end of said support post when said tone arm is urged downwardly thereagainst so as to fixedly associate said tone arm with said support post, said tone arm being releasable from said support post upon manual lifting of said tone arm, locking means for releasably locking said support post in said upright operative position, said support post being movable vertically a limited amount when in its upright position between a lower vertical position wherein said locking means is operative and an upper vertical position wherein said locking means is inoperative, said support post normally being said lower vertical position when supporting said tone arm in said storage position and being movable by said tone arm to its upper vertical position when said tone arm is raised, and means for biasing said support post for pivotal movement towards its retracted inoperative position whereby when said tone arm is manually lifted to release the same from said support post the latter will be moved to said upper vertical position and will subsequently be automatically pivoted to said retracted position when said tone arm is released therefrom.

8. The invention of claim 7 wherein said retractable support post is pivotally mounted on a fixed pin which extends through a longitudinal slot formed in said support post to permit said limited vertical movement of said support post when the latter is in said upright position, and wherein spring means is provided for biasing said support post toward its retracted inoperative position and for biasing said support post downwardly when in its upright position.

9. In a record changer of the type having a baseplate, a turntable, and a tone arm pivotable about a vertical axis for reproducing records on the turntable, the improvement comprising, in combination, a support post adapted to extend upwardly from the baseplate to support the tone arm in a storage position, pivotal mounting means mounting said support post for pivotal movement between an upright operative position wherein it is adapted to support said tone arm and a retracted inoperative position wherein it is disposed beneath the level of a record on the turntable, locking means for releasably locking said support post in said upright operative position, said support post being movable vertically a limited amount when in its upright position between a lower vertical position wherein said locking means is operative and an upper vertical position wherein said locking means is inoperative, said support post normally being in said lower vertical position when supporting said tone arm in said storage position, and means for biasing said support post for pivotal movement toward its retracted inoperative position whereby when the tone arm is manually lifted to release the same from said support post the latter will be moved to said upper vertical position and will subsequently be automatically pivoted to said retracted position when said tone arm is released therefrom.

10. The invention of claim 9 wherein said retractable support post is pivotally mounted on a fixed pin which extends through a longitudinal slot formed in said support post to permit said limited vertical movement of said support post when the latter is in said upright position, and wherein spring means is provided for biasing said support post toward its retracted inoperative position and for biasing said support post downwardly when in its upright position.

11. The invention of claim 9 wherein an opening is provided in said baseplate and wherein when said support post is in said retracted inoperative position it is retracted within said opening so as to lie substantially beneath the upper surface of said baseplate.

12. The invention of claim 11 wherein a finger lift is formed on said support post to facilitate manual lifting of said post from its retracted position and placement of the same in said upright operative position.

References Cited by the Examiner

UNITED STATES PATENTS 2,955,825 10/1960 Stoar ------------- 274—23.2

NORTON ANSHER, *Primary Examiner.*

C. PRICE, *Assistant Examiner.*